United States Patent
Kumar et al.

(10) Patent No.: US 12,217,259 B2
(45) Date of Patent: Feb. 4, 2025

(54) SYSTEMS AND METHODS FOR USER AUTHENTICATION TO VERIFY TRANSACTION LEGITIMACY

(71) Applicant: Capital One Services, LLC, McLean, VA (US)

(72) Inventors: Kaush Kumar, Falls Church, VA (US); Jennifer Chu, San Francisco, CA (US); Anand Kumar, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 239 days.

(21) Appl. No.: 17/515,260

(22) Filed: Oct. 29, 2021

(65) Prior Publication Data
US 2023/0135488 A1 May 4, 2023

(51) Int. Cl.
*G06Q 20/40* (2012.01)
*G06Q 20/20* (2012.01)
*G06Q 20/32* (2012.01)

(52) U.S. Cl.
CPC ..... *G06Q 20/40145* (2013.01); *G06Q 20/202* (2013.01); *G06Q 20/3224* (2013.01); *G06Q 20/405* (2013.01); *G06Q 20/407* (2013.01)

(58) Field of Classification Search
None
See application file for complete search history.

(56) References Cited

U.S. PATENT DOCUMENTS

| 9,305,230 B2 | 4/2016 | Abulafia et al. |
| 10,277,588 B2 | 4/2019 | Ball et al. |
| 11,157,906 B1 * | 10/2021 | Smith ................. G06Q 20/405 |

(Continued)

FOREIGN PATENT DOCUMENTS

| WO | WO-2012135372 A2 * | 10/2012 | ............ G06Q 20/40 |

OTHER PUBLICATIONS

Akhtar, Z. et al., "A Face in any Form: New Challenges and Oppotunities for Face Recognition Technology", IEEE Computer Society, 2017. (Year: 2017).*

(Continued)

*Primary Examiner* — Clay C Lee
(74) *Attorney, Agent, or Firm* — TROUTMAN PEPPER HAMILTON SANDERS LLP; Christopher J. Forstner; John A. Morrissett

(57) ABSTRACT

The disclosed technology relates to improved user authentication to verify transaction legitimacy. An exemplary system may send a request for a current image to a mobile device associated with a user. The request may include an indication of a requested action to be performed by the user. The system may classify an action depicted in the current image obtained in response to the request. A determination may be made as to whether the depicted action corresponds to the requested action based on the classification. When it does correspond, the system may compare facial feature(s) recognized in obtained past image(s) associated with the user to a facial feature(s) recognized in the current image to determine when the user is depicted in both the past image(s) and the current image. When the user is depicted in both the past image(s) and the current image, the system may allow the transaction to proceed.

18 Claims, 5 Drawing Sheets

(56) References Cited

U.S. PATENT DOCUMENTS

| | | | |
|---|---|---|---|
| 2012/0173325 A1* | 7/2012 | Johri | G06Q 20/401 |
| | | | 705/17 |
| 2014/0244514 A1 | 8/2014 | Rodriguez et al. | |
| 2015/0073907 A1* | 3/2015 | Purves | G06Q 20/384 |
| | | | 705/14.58 |
| 2016/0071111 A1* | 3/2016 | Wang | G06V 40/45 |
| | | | 705/44 |
| 2017/0124540 A1* | 5/2017 | Chan | G06V 40/172 |
| 2020/0019970 A1* | 1/2020 | Pham | G06Q 20/3224 |
| 2020/0042682 A1* | 2/2020 | Johnson | G06F 21/32 |
| 2021/0065195 A1 | 3/2021 | Wang et al. | |
| 2023/0137135 A1* | 5/2023 | Gupta | G06Q 20/40145 |
| | | | 705/17 |

OTHER PUBLICATIONS

Cao, S., "Applying Multimodal Sensing to Human Motion Tracking in Mobile Systems", Purdue University, Aug. 2020. (Year: 2020).*

* cited by examiner

SYSTEMS AND METHODS FOR USER AUTHENTICATION TO VERIFY TRANSACTION LEGITIMACY

FIELD

The disclosed technology relates to systems and methods for authentication, and more particularly to user authentication to verify transaction legitimacy using an analysis of current and past user images.

BACKGROUND

Credit card lenders are faced with the problem of fraudulent credit card purchases and associated revenue loss when goods or services are obtained using lost or stolen credit cards. While data such as geolocation of a mobile device associated with a user performing a transaction can be analyzed, it is currently difficult to determine whether a user performing a transaction is a legitimate or fraudulent user. For example, if a user's mobile device is stolen, then the geolocation of that device will not be a valid indicator of the legitimacy of a transaction performed with the user's stolen credit card. Other fraud indicators and multi-factor authentication techniques (e.g., purchase history or spend patterns, verification codes, one time passcodes, etc.) introduce significant friction to transactions for legitimate cardholders and have deficiencies that also can be circumvented by illegitimate actors.

Accordingly, there is a need for improved fraud-detection systems that are capable of authenticating legitimate users associated with credit card and other types of transactions. The disclosed systems and methods are directed to this and other considerations.

BRIEF SUMMARY

Aspects of the disclosed technology include systems and methods for limiting fraudulent credit card and other types of transactions based, for example, on a comparison between past image(s) of a legitimate user authorized with respect to the transaction (e.g., the user may be associated with the credit card used in the transaction) to a real-time or current image of a person captured by a mobile device associated with the legitimate user. Credit card purchases and other step-up transactions, for example, may be approved or declined based on whether the person depicted in the current image matches the legitimate user depicted in the past image(s).

The disclosed technology includes an authentication system that includes one or more processors and memory in communication with the one or more processors and storing instructions that, when executed by the one or more processors, are configured to cause the system to perform one or more methods. For example, the system may determine whether a verification condition is satisfied based on received transaction data associated with a user and a transaction. Responsive to the transaction data triggering a verification condition, the system may obtain stored mobile data for a user. The transaction data includes identifying data unique to the user and the mobile data is obtained based on the identifying data in some examples. The system may then send, via one or more networks and a mobile application executing on a mobile device associated with the user, a request for a current image. The mobile application can be identified based on the mobile data and the request can include an indication of a requested action to be performed by the user. The system then analyzes the current image to classify an action depicted in the current image after the current image is obtained from the mobile device in response to the request. Responsive to determining the depicted action corresponds to the requested action, the system may obtain one or more past images associated with the user from one or more of a camera roll of the mobile device, a social media account of the user, or stored account data associated with the user, for example. The system may then compare a first set of one or more facial features extracted from the one or more past images to a second set of one or more facial features extracted from the current image to determine when the user is depicted in both one or more of the one or more past images and the current image. When the user is depicted in both the one or more past images and the current image, the system may allow the transaction to proceed.

The disclosed technology includes another authentication system that includes one or more processors and memory in communication with the one or more processors and storing instructions that, when executed by the one or more processors, are configured to cause the system to perform one or more methods. For example, the system may receive transaction data associated with a user and a transaction. A determination may then be made by the system as to whether the transaction data satisfies a verification condition based on geographic locations of the mobile device and a merchant point-of-sale terminal from which the transaction was received, whether a credit card associated with the transaction has been reported as lost or stolen, a risk level generated for the transaction, whether the transaction is a step-up transaction, or combinations thereof, for example. The system may then obtain stored mobile data for a user, when the received transaction satisfies the verification condition. The transaction data may include identifying data unique to the user and the mobile data is obtained based on the identifying data. The system may send, via one or more networks and a mobile application executing on a mobile device associated with the user, a request for a current image. The mobile application may be identified based on the mobile data and the request may include an indication of a requested action to be performed by the user. The system then analyzes the current image to classify an action depicted in the current image after the current image is obtained from the mobile device in response to the request. Responsive to determining the depicted action corresponds to the requested action, the system may compare a first set of one or more facial features recognized in one or more obtained past images associated with the user to a second set of one or more facial features recognized in the current image to determine when the user is depicted in both the one or more past images and the current image. When the user is depicted in both the one or more past images and the current image, the system may allow the transaction to proceed.

The disclosed technology includes yet another authentication system that includes one or more processors and memory in communication with the one or more processors and storing instructions that, when executed by the one or more processors, are configured to cause the system to perform one or more methods. For example, the system may receive transaction data associated with a user and a transaction. Responsive to receiving the transaction data, the system may determine whether the transaction data satisfies one or more verification conditions. Responsive to determining that the transaction data satisfies the one or more verification conditions, the system may send a request for a current image to a mobile device associated with the user.

The request may include an indication of a requested action to be performed by the user. The system may then classify an action depicted in the current image after the current image is obtained from the mobile device in response to the request. A determination may then be made by the system as to whether the depicted action corresponds to the requested action based on the classification. When the depicted action corresponds to the requested action, the system may compare a first set of one or more facial features recognized in one or more obtained past images associated with the user to a second set of one or more facial features recognized in the current image to determine when the user is depicted in both the one or more past images and the current image. When the user is depicted in both the one or more past images and the current image, the system may allow the transaction to proceed.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

DETAILED DESCRIPTION

Figure 1:
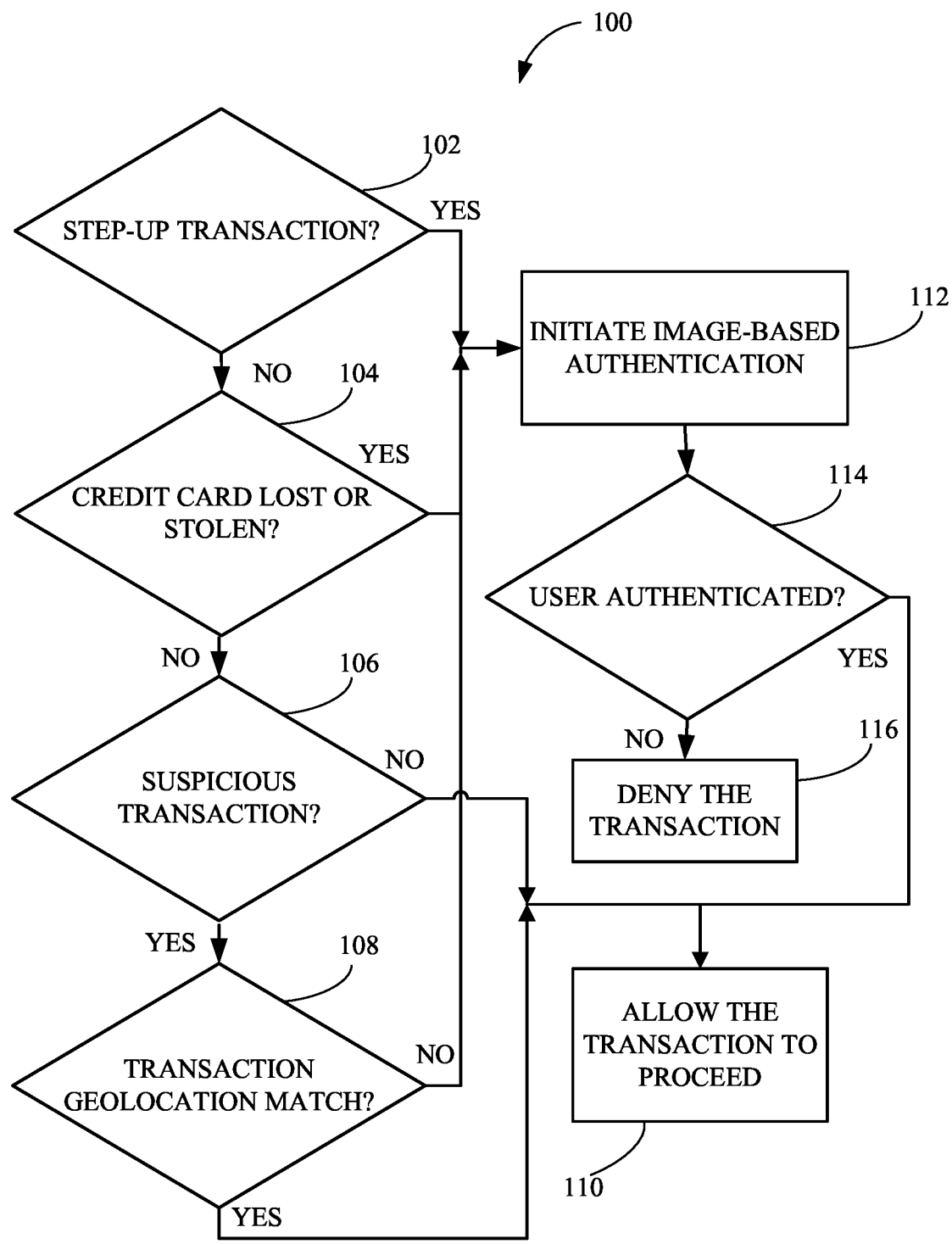
FIG. 1 is a flow diagram of an example method 100 for analyzing exemplary verification conditions to determine when to initiate image-based authentication for a transaction, in accordance with an exemplary embodiment of the disclosed technology.

Certain implementations of the disclosed technology may be utilized to limit or eliminate fraudulent credit card purchases and other transactions. A user associated with an initiated transaction that satisfies a verification condition, such as a suspicious purchase or a step-up transaction, is subject to an image-based authentication process using a mobile device 440 of a legitimate user associated with the transaction. For example, a purchase may be initiated via a credit card and received at a service provider system 420 that may determine that the purchase is suspicious because the purchase amount exceeds an established threshold for the user. Since the purchase is determined to be suspicious, a verification condition is satisfied and the service provider system 420 can initiate an image-based authentication process via a mobile application associated with the service provider and executed by a mobile device 440 associated with the user.

As will be described and illustrated in more detail below, the image-based authentication process in some examples requires the user to capture a current image of the user performing a particular requested action using a camera of the mobile device 440, and submit the current image via the mobile application. An authentication system 430 within, or in communication with, the service provider system 420 may receive the current image and obtain past image(s) of the legitimate user associated with the credit card to determine whether the current user of the credit card is the legitimate user. The past image(s) can be obtained based on a stored profile associated with the server provider, a camera roll on the mobile device 440, or social media account(s) for the legitimate user that are accessible via the mobile device 440, for example. If the user is classified as performing the requested action in the current image, and a face matching algorithm indicates a match between the current image and past image(s), then the transaction is allowed to proceed.

By requiring an action to be depicted in the current image, a stolen mobile device 440 and historical image cannot easily be used to satisfy the image-based authentication. Additionally, a current image captured by an illegitimate user will not result in a facial recognition match with past image(s) of the legitimate user associated with the transaction. Accordingly, implementations of the disclosed technology provide a more effective user authentication method for credit card, step-up, and other types of transactions, and may prevent or limit fraudulent transactions and associated damages/costs for service providers (e.g., financial service providers).

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 is a flow diagram of an example method 100 for analyzing exemplary verification conditions to determine when to an initiate image-based user authentication process for a transaction, in accordance with an exemplary embodiment of the disclosed technology. Method 100 may be performed by a system (e.g., an authentication system 430 and/or one or more subsystems thereof, such as a verification system 410 or service provider system 420, as described in more detail with respect to FIGS. 4-5). The system includes one or more processors and memory in communication with the one or more processors and storing instructions. When executed by the one or more processors, the stored instructions cause the system to perform certain functions, such as one or more steps described and illustrated herein with reference to method 100.

In block 102, the system may determine whether a step-up transaction is initiated. The step-up transaction can be any type of transaction identified as requiring additional user authentication. For example, the service provider system 420 can determine that a cash advance was requested by a user of the mobile device 440 or another user device (not shown) coupled to the network 460 in an example in which the service provider system 420 is associated with a financial service provider. In this example, a cash advance is identified at the service provider system 420 as a step-up transaction. In another example, the service provider system 420 can receive a request to add a bank account to transfer funds, which is identified in memory of the service provider system 420, for example, as a step-up transaction. Other types of step-up transactions can be analyzed as step-up transactions and other service providers systems associated with other types of entities can also be used in other examples. If the system determines that a step-up transaction has not been initiated, then the No branch is taken to block 104.

In block 104, the system may determine whether a transaction have been initiated with a credit card that has been reported as lost or stolen. In this example, a user associated with the credit card may be report to the service provider system 420 that their credit card has been lost or stolen, and the service provider system 420 may mark the associated credit card number or other unique identifier in memory has being stolen. While the legitimate user is waiting for a new credit card to issue, the user may initiate an online transaction with the credit card details previously saved at a merchant website, or an illegitimate user that stole the credit card may attempt to use the credit card to make a purchase via the merchant point-of-sale (POS) terminal 450, for example. In these examples, the system can allow the purchase if the image-based authentication described and illustrated in more detail below is satisfied. However, if the system in the current iteration determines that a transaction has not been initiated with a credit card that has been reported as lost or stolen, then the No branch is taken to block 406.

In block 106, the system may determine whether a transaction is initiated that is suspicious. In one example, the system (e.g., the service provider system 420) can generate a risk score for received credit card purchase transactions, which is compared to a risk threshold to determine whether the condition in block 106 is satisfied. Various parameters can be used to generated the risk score, or for determining whether a transaction is suspicious in other manners, including spend history, credit limit, purchase amount, geolocation risk (e.g., foreign country), merchant risk (e.g., merchant IP address flagged as a risk), merchant type or identity, or combinations thereof, for example. In this example, the risk score can be dynamic or static and/or generated for every transaction for some users and/or only a subset of transaction satisfying prerequisite criteria for other users. Additionally, the parameters input to generate the risk score can be weighted and/or can vary for different users.

In another example, failure to satisfy only one of the parameters can be satisfy the condition in block 106. For example, geolocation risk can be analyzed by determining the geolocation of the immediately prior purchase by the user using the same method (e.g., credit card) and the geolocation associated with the current transaction (e.g., geolocation of the merchant POS terminal 450) along with the time differential. If the immediately prior purchase was made minutes earlier and hundreds of miles away, the system may determine in block 106 that the current transaction is suspicious. Any number of other methods for satisfying the condition in block 106 can also be used in other examples. If the system determines that the current transaction is not suspicious, then the No branch is taken to block 108.

In block 108, the system may determine whether there is a geolocation match between a first geolocation associated with the transaction and a second geolocation associated with the user. In one particular example, the first geolocation associated with the transaction can be an IP address corresponding to the merchant POS terminal 450 from which the transaction was initiated, and the second geolocation associated with the user can be generated by pinging the mobile device 440 associated with the user. In this example, the service provider system 420, for example, can receive the transaction, determine the first geolocation from merchant data included with the transaction, determine information regarding the mobile device 440 and service provider application 470 based on a stored correlation of identifying data (e.g., a credit card number) included with the transaction, and ping the mobile device 440 to obtain the second geolocation. If the first and second geolocations are within a proximity threshold (e.g., indicative of the user's mobile device 440 being located close enough to the merchant POS terminal 450 to initiate the transaction), then the condition in block 108 may be satisfied. Other methods for performing a geolocation analysis in block 108 for other types of transactions can also be used in other examples. If the system determines that there is a geolocation match, then the Yes branch is taken to block 110.

In block 110, the system may allow the transaction to proceed. For example, when the transaction is a purchase transaction, the service provider system 420 can allow the purchase to proceed by exchanging the appropriate funds to another financial service provider associated with a merchant, although other types of transactions can be allowed to proceed in different manners.

Accordingly, in the particular example described and illustrated with reference to FIG. 1, the geolocation is analyzed when the transaction is determined by the system to be suspicious. If the geolocation analysis indicates a match, then the transaction is allowed to proceed. However, if the system determines in block 106 that the transaction is not suspicious (and therefore is not a step-up transaction nor reported as lost or stolen), then the No branch is taken to block 110 and the transaction is also allowed to proceed. However, if the system determines that a step-up transaction is initiated and the Yes branch is taken from block 102, a transaction is initiated with a lost or stolen credit card and the Yes branch is taken from block 104, or there is not a geolocation match and the No branch is taken from block 108, then the system proceeds to block 112.

In block 112, the system may initiate an image-based user authentication to determine whether to authenticate a user associated with a received transaction and thereby verify the legitimacy of the transaction. While exemplary verification conditions are illustrated in this particular example with reference to blocks 102, 104, 106, and 108, other types of verification conditions can be used in other examples to trigger an image-based user authentication process. The image-based authentication process will not be explained with reference to FIG. 2.

Figure 2:
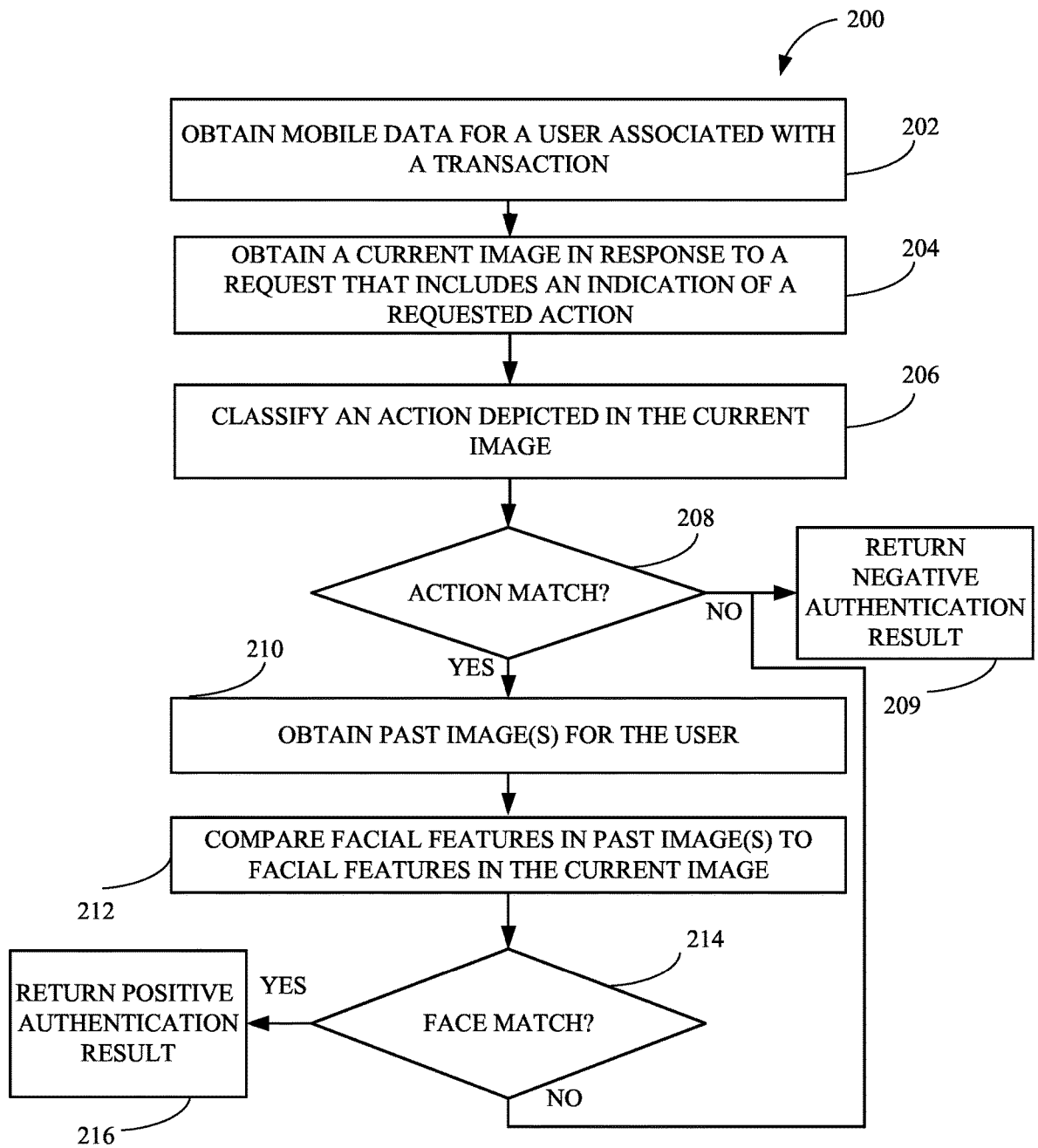
FIG. 2 is a flow diagram of an example method 200 for image-based authentication for a transaction satisfying a verification condition, in accordance with another exemplary embodiment of the disclosed technology.

In FIG. 2, a flow diagram is illustrated of an example method 200 performed by a system for image-based authentication for a transaction satisfying a verification condition, in accordance with another exemplary embodiment of the disclosed technology. The system includes one or more processors and memory in communication with the one or more processors and storing instructions. When executed by the one or more processors, the stored instructions cause the system to perform certain functions, such as one or more steps described and illustrated herein with reference to method 200.

In block 202, the system may obtain mobile data for a user associated with a transaction (e.g., a received transaction analyzed for satisfaction of a verification condition as described above). The mobile data for a user can include identifying information for the mobile device 440 associated with the user, the service provider application 470 executing on the mobile device 440, and/or network data for facilitating communications with the mobile device 440, for example. In some examples, the transaction is received at the service provider system 420, which maintains a local or external database 580 of customer or user data that can be correlated with transaction data received with the transaction (e.g., a credit card number) to obtain the mobile data for the user. Other types of mobile data and methods for obtaining the mobile data can also be used in other examples.

In block 204, the system may obtain a current image in response to a request that includes an indication of a requested action. In this example, the system may initiate a request for a current image via the service provider application 470, which was previously installed on, and executed by, the mobile device 440, based on the obtained mobile data. The request in some examples includes an indication of an action to be performed by the user during capture of the current image, such as a textual description or graphical depiction of the action. In one particular example, a graphical emoji or memoji illustrating the action can be included in the request sent by the system in block 204, although other types of action indications can also be used in other examples. The action can be a thumbs up/down or look left/right, for example, and can be selected randomly or based on particular criteria optionally based on the transaction data associated with the transaction. Optionally, the service provider application 470 is configured to process and display the request received from the system, as well as request access to a camera of the mobile device 440 and transmit the current image captured via the camera in response to the request.

In block 206, the system may classify an action depicted in the current image obtained in block 204. Accordingly, the system may implement an image processing algorithm to identify an action represented by a person depicted in the obtained image. The image processing algorithm can be a machine learning algorithm trained based on a training set of images with actions being performed therein, although other types of image processing algorithms can be implemented to facilitate the classification in block 206.

In block 208, the system may determine whether the classified action depicted in the obtained current image matches the requested action indicated in the request sent in block 204. By requiring an action to be performed, the condition tested in block 208 improves the likelihood that the current image is a live or real-time image captured and provided responsive to the particular request sent in block 204, and not a static, historical image. If an illegitimate user stole the mobile device 440, the illegitimate user may be able to submit an image retrieved from memory of the mobile device 440 that reflects the legitimate user of the mobile device 440, but may not depict the requested action and will therefore fail the condition in block 208. If the system determines that there is not an action match, then the No branch is taken to block 209 and a negative authentication result is returned. However, if there is an action match, then the Yes branch is taken to block 210.

Figure 3:
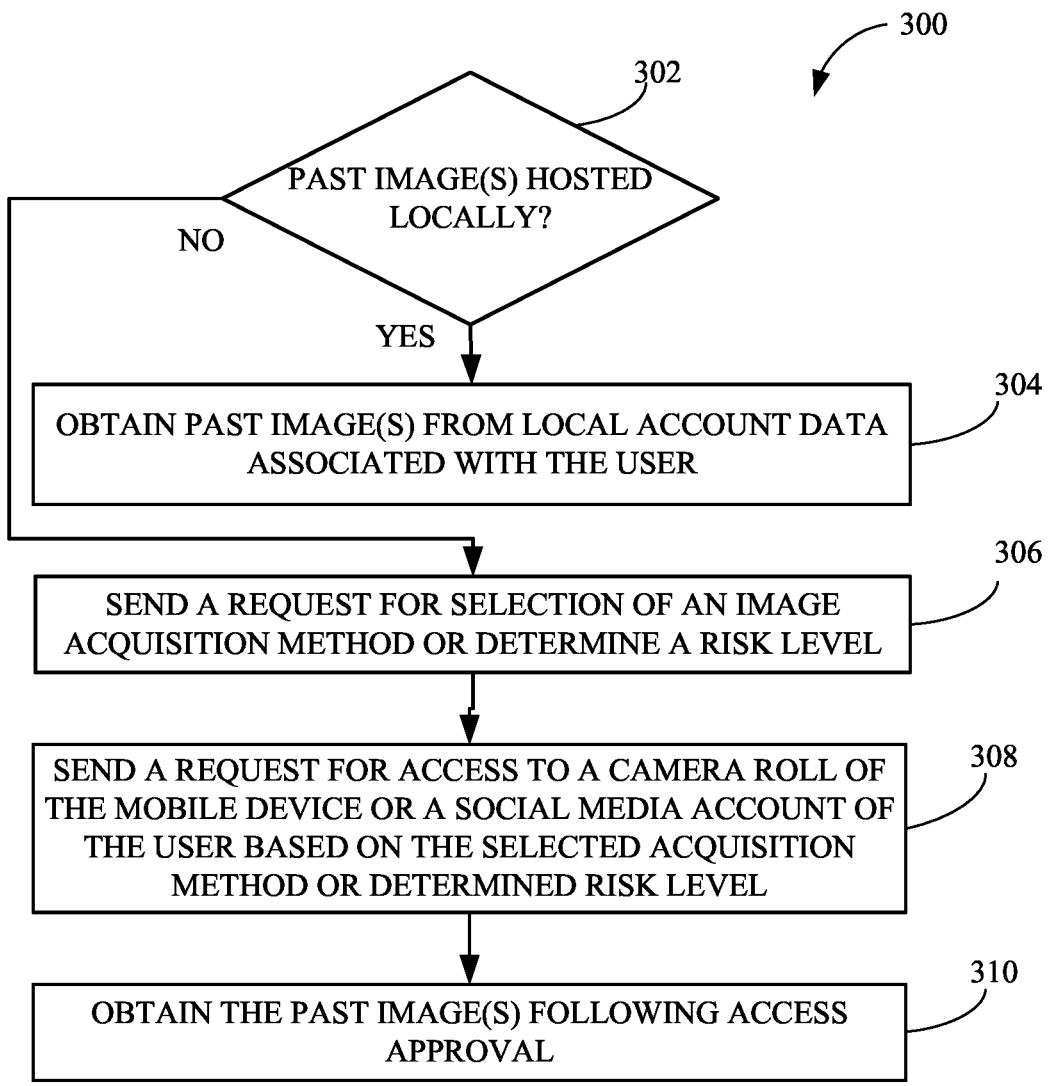
FIG. 3 is a flow diagram of an example method 300 for obtaining past image(s) to facilitate image-based authentication for a transaction, in accordance with yet another exemplary embodiment of the disclosed technology.

In block 210, the system may obtain past image(s) for the legitimate user associated with the transaction. The past image(s) can be used in a comparison with the current image to determine whether, or the likelihood that, the legitimate user associated with the transaction is a current user of the mobile device 440 that corresponds to the legitimate user, in order to authenticate the user and verify the transaction legitimacy. FIG. 3 is a flow diagram of an example method 300 performed by a system for obtaining past image(s) to facilitate image-based authentication for a transaction, in accordance with yet another exemplary embodiment of the disclosed technology. When executed by the one or more processors, the stored instructions cause the system to perform certain functions, such as one or more steps described and illustrated herein with reference to method 300.

In block 302, the system may determine whether past image(s) are hosted locally. In one particular example, the user associated with the transaction received by the service provider system 420 may have an account maintained with the service provider that has associated account data including profile or other types of image(s) that include a depiction of the user (e.g., facial features of the user), for example. In other examples, the past image(s) can be hosted in other manners that facilitate local or direct access by the system without initiating a request to the mobile device. If the system determines that past image(s) are hosted locally, then the Yes branch is taken to block 304.

In block 304, the system may obtain the past image(s) from the local storage (e.g., local account data associated with the user associated with the transaction). Any number of past images can be obtained in various examples. In some examples, the obtained past image(s) are a subset of the image(s) hosted locally for the user, which can be selected based on any criteria such as image quality, facial depiction, or zoom level, for example. However, if the system determines in block 302 that there are no past images hosted locally, then the No branch is taken to block 306.

In block 306, the system may send a request for selection of an image acquisition method or determine a risk level, which is used to determine the acquisition method. In some examples, the request for selection of an image acquisition method can be sent via the service provider application 470 and can include a selection interface configured to facilitate a selection by a user of the mobile device 440 of a camera roll, social media account, or other source or method of acquiring and providing the past image(s). In another example, the system can automatically select an acquisition method based on a determined risk level for the transaction. The risk level generated earlier with reference to block 106 can be used in block 306, or a new risk level can be generated in the same or similar manner as explained in detail above.

In some examples, one acquisition method may be more rigorous and can be automatically selected for transactions having risk levels exceeding a risk threshold. In other examples, multiple acquisition method can be required for transactions determined to have a relatively high risk (including locally-hosted image(s)). In yet other examples, the optional acquisition methods provided for selection via the request in block 306 can be determined based on the risk level. Also optionally, the past image acquisition method is selected at random without user input or determining a risk level, and other methods for determining the acquisition method can also be used in other examples.

In block 308, the system may send a request for access to a camera roll of the mobile device 440 and/or a social media account of the user, based on the acquisition method selected by the user, as indicated in a received response to the request sent in block 306, or determined by the system (e.g., based on the risk level). In other examples, the access authorization can be provided upon download/installation of the service provider application 470 instead of per transaction (e.g., following the request sent in block 308), for example. Optionally, if the request sent in block 306 and/or 308 is denied at the mobile device 440, the transaction can be denied, as explained below with reference to block 116.

In block 310, the system may obtain the past image(s) from the service provider application 470 following receipt by the service provider application 470 of access approval from a user of the mobile device 440. In this example, the service provider application 470 is configured to request access to a camera roll or other image storage data structure maintained locally on the mobile device 440 or remotely (e.g., via cloud storage) upon authorization from the user. Additionally or alternatively, the service provider application 470 can be configured to access another mobile application (not shown) associated with a social media service subscribed to by the user in order to retrieve the past image(s) from local or remote storage associated with a social media account (e.g., one or more photo albums) profile upon authorization from the user. In some examples, application programming interfaces (APIs) provided by the operating system and/or the social media service can be used by the service provider application 470 to obtain the past image(s).

Optionally, the obtained images can be analyzed for quality. For example, the system can extract metadata from the past image(s) to determine a capture date associated with the past image(s). If the capture date fails to satisfy a recentness threshold, the past image(s) may be relatively low value or quality due to their age and, as a result, the system can require that the past image(s) are obtained via another method or deny the transaction, for example. While particular exemplary image acquisition methods are illustrated in FIG. 3, other methods for accessing the past image(s) can also be used. Additionally, any single or combination of methods can be selected based on any criteria and used to acquire any number of past image(s) in other examples.

Referring back to FIG. 2, in block 212, the system may compare facial features in the past image(s) obtained in block 210 to facial features in the current image obtained in block 204. Any facial recognition or face matching algorithm can be used to extract the facial features (e.g., eyes, nose, and/or mouth) and/or properties thereof (e.g., size and/or location) from the various images and compare the facial features (e.g., in the form of a feature vector) to determine whether there is a match. Exemplary face matching algorithms include geometric and/or photometric recognition algorithms that utilize one or more of principal component analysis, linear discriminant analysis, elastic bunch graph matching, hidden Markov models, multilinear subspace learning using tensor representation, or neuronal motivated dynamic link matching, for example.

Accordingly, the comparison can be based on a pixel-by-pixel analysis, a template matching technique, landmark detection (e.g., position, size, and/or shape of the eyes, nose, cheekbones, and/or jaw), and/or extracted facial signature data, for example. Optionally, the facial recognition algorithm can use one or more artificial intelligence techniques (e.g., machine learning, deep learning, artificial neural networks, or the like) to perform the facial recognition analysis. Also optionally, the system may apply one or more image processing technique to the past image(s) obtained in block 210 and/or the current image obtained in block 204 to improve the comparison, including background extraction, segmentation, image enhancement, and/or alternation of image properties such as brightness, saturation, contrast, and/or color, for example. In some examples, a likelihood match value is generated by the system in block 212 based on the comparison.

In block 214, the system may determine whether the same face is depicted in both the current and past image(s). In examples in which a likelihood match value is generated, the likelihood match value can be compared to a likelihood threshold to determine whether the faces in the current and past images match or otherwise are relatively likely to represent the same user. In examples in which a plurality of past image(s) are obtained, any number of the past images can be required to depict a match of the face depicted in the current image in order for the condition in block 214 to be satisfied. Additionally, while facial recognition is used in this example, other portions of the human body can be used in other examples, and other methods for determining whether the current and past image(s) depict the same user can also be used. If the system determines in block 214 that the faces do not match, then the No branch is taken to block 209 and a negative authentication result is returned. However, if the system determines that the faces in the current and past image(s) do match, then the Yes branch is taken to block 216 and a positive authentication result is returned.

Referring back to FIG. 1, in block 114, the system may determine whether the user associated with the transaction is authenticated based on the result of the image-based authentication initiated in block 112 and described and illustrated in detail above with reference to FIGS. 2-3. If a positive authentication result is returned by the image-based authentication, then the Yes branch is taken to block 110 and the transaction is allowed to proceed. However, if a negative authentication result is returned by the image-based authentication, then the No branch is taken from block 114 to block 116.

In block 116, the system may deny the transaction. To deny the transaction, the system can decline the credit card via a return message to the merchant POS terminal 450, output for display on the mobile device 440 an indication that a step-up transaction was rejected, or take any other action reflecting a failure to authenticate the user associated with the transaction. Optionally, the system can provide additional opportunities to satisfy the requirements of the image-based authentication described above with reference to block 112 or initiate another authentication or multi-factor authentication process. Optionally, the system also can cause the transaction processing to time out after a threshold time period has expired by denying the transaction and/or requiring the transaction, or one or more steps therein, to be restarted. Also optionally, the system can update stored account data for the user to indicate that the transaction was denied in order to flag or report the credit card and/or user account as associated with a potentially fraudulent transaction.

Figure 4:
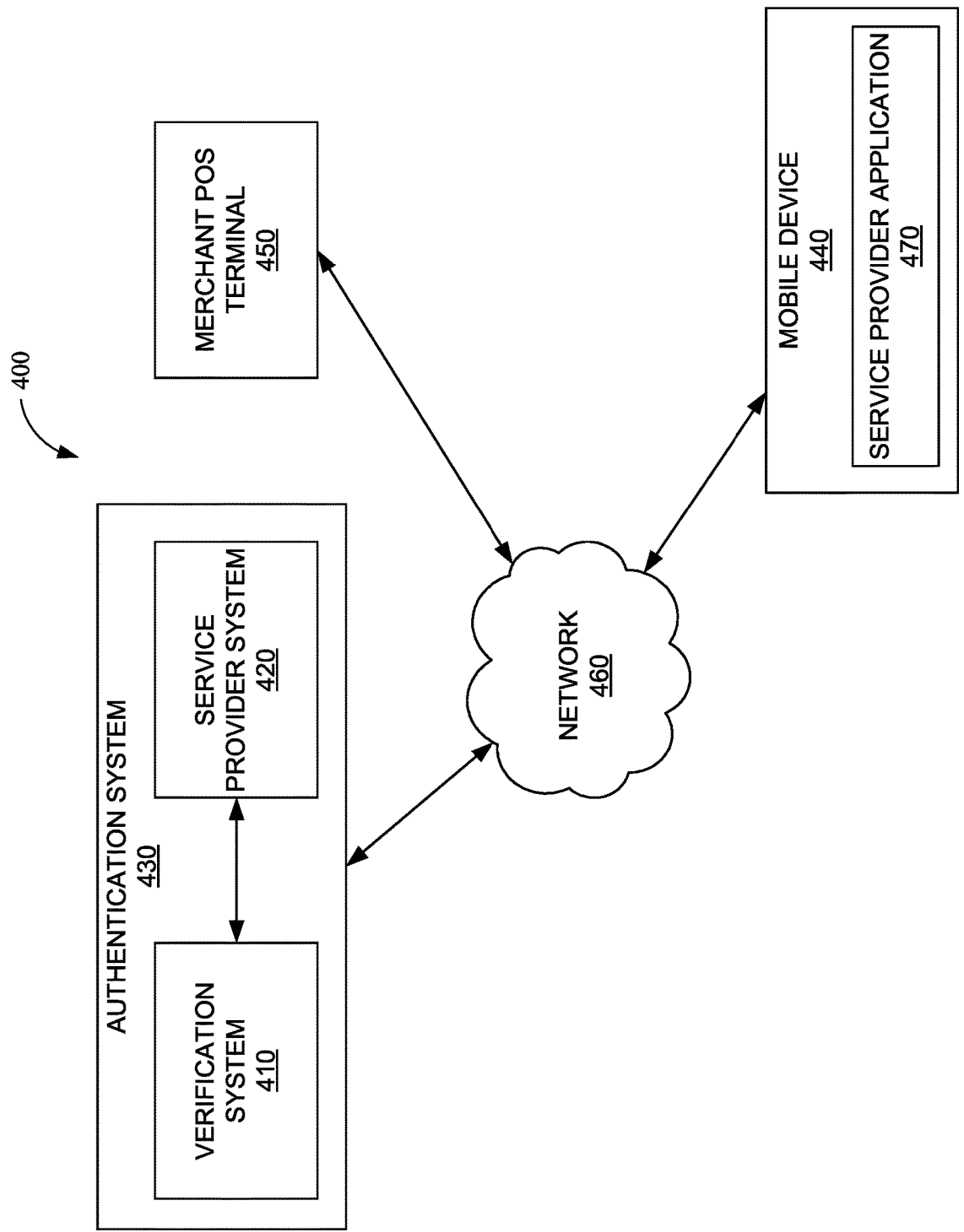
FIG. 4 is a block diagram of a network environment 400 that includes an authentication system 430, according to certain exemplary implementations of the disclosed technology.

FIG. 4 is a block diagram of a network environment 400 that includes an authentication system 430, according to certain exemplary implementations of the disclosed technology. The authentication system 430 (as will be discussed in more detail below with reference to FIG. 5) may include or be in communication with the service provider system 420 (e.g., associated with a financial service provider or any service provider facilitating transactions requiring authentication) and a verification system 410. In certain implementations, the service provider system 420 may store and/or have access to detailed customer information, such as identifying information, stored profiles with customer images, credit card data, or mobile device data, for example. The service provider system 420 in some examples is configured to process credit card transactions verified by the verification system 410 as initiated by authenticated users.

Accordingly, in accordance with certain exemplary embodiments, the verification system 410 is configured to process transactions for which the service provider system 420 has determined one or more verification conditions are satisfied. The processing of the transaction by the verification system 410 can be in accordance with the image-based authentication described in detail above with reference to block 112 of FIG. 1, for example. The verification system 410 can then send an authentication result to the service provider system 420, which denies or allowed the transaction according to the authentication result. While the verification system 410 and service provider system 420 are illustrated in FIG. 4 as separate systems, the verification system 410 and service provider system 420 can be integral with one another (e.g., with the verification system 410 being implemented as a module or application executed by the service provider system 420). In other examples, the verification system 410 is coupled to the service provider system 420 via the network 460 or another communications network and other configurations or network topologies can also be used in other examples.

In certain implementations, the mobile device 440 may be associated with a services provider customer (via the service provider system 420) and may host the service provider application 470 that is linked to the service provider system 420. The mobile device 440 may be a smart phone, tablet computer, smart wearable device, portable laptop computer, voice command device, wearable augmented reality device, or any other mobile computing device. The service provider application 470 can facilitate presentation of requests from the authentication system 430 (e.g., for a current image, for access to a camera roll or social media account, etc.), as well as send the response to such requests to the authentication system 430.

The merchant POS terminal 450 may be associated with an entity such as a business, corporation, individual, partnership, or any other entity that may be a seller of good and/or services. The merchant POS terminal 450 can communicate with the service provider system 420 via the network 460 to conduct a purchase transaction. Based at least in part on an analysis of transaction data communicated by the merchant POS terminal 450, the authentication system 430 may determine that a verification condition is satisfied, and an image-based authentication process should be conducted, although the image-based authentication can be initiated based on other types of transactions (e.g., step-up transactions), as explained in more detail above.

The network 460 may be of any suitable type, including individual connections via the Internet such as cellular or WiFi networks. In some implementations, the network 460 may enable the communication(s) between the various systems and devices as depicted in FIG. 4. In some embodiments, the network 460 may connect with the mobile device 440 using available channels, including but not limited to: radio-frequency identification (RFID), near-field communication (NFC), Bluetooth™, low-energy Bluetooth™ (BLE), WiFi™, ZigBee™, ambient backscatter communications (ABC) protocols, USB, Ethernet, or LAN. In some embodiments, data can be transmitted across the network 460 in either an encrypted or un-encrypted format. The network 460 can comprise a mobile network interface that provides access to a cellular network, the Internet, or another wide-area network. In some embodiments, a mobile network interface may include hardware, firmware, and/or software that allows one or more processors to communicate with other devices via wired or wireless networks, whether local or wide area, private or public, as known in the art.

As described above, the verification system 410, service provider system 420, and any of the other devices depicted in the network environment 400 may be configured to remotely communicate with one another and may include one or more of a microprocessor, microcontroller, digital signal processor, co-processor, memory, or the like or combinations thereof capable of executing stored instructions and operating upon stored data. The memory may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, hard disks, flash memory, a redundant array of independent disks (RAID), solid state drives (SSDs), and the like), for storing files including an operating system, application programs (including, for example, a web browser application or other applications, as necessary), executable instructions and data. In one embodiment, the processing techniques described herein are implemented as a combination of executable instructions and data within the memory.

The network environment 400 may include one or more storage devices configured to store information used by one or more processors (or other components) to perform certain functions related to the disclosed embodiments. In one example, the network environment 400 may include memory storing instructions to enable one or more processors to execute one or more applications, such as server applications, network communication processes, and any other type of application or software known to be available on computer systems. Alternatively, the instructions, application programs, etc. may be stored in an external storage or available from a memory over the network 460. The one or more storage devices may be volatile or non-volatile, magnetic, semiconductor, tape, optical, removable, non-removable, or other type of storage device or tangible, non-transitory computer-readable medium.

In one embodiment, the network environment 400 may include memory that includes instructions that, when executed by one or more processors (e.g., processors of one or more devices of the authentication system 430), perform one or more processes consistent with the functionalities disclosed herein. Methods, systems, and articles of manufacture consistent with disclosed embodiments are not limited to separate programs or computers configured to perform dedicated tasks.

The network environment 400 may also be communicatively connected to one or more memory devices (e.g., databases (not shown)) locally or through the network 460. The remote memory devices may be configured to store information and may be accessed and/or managed by the authentication system 430. By way of example, the remote memory devices may be document management systems, Microsoft® SQL databases, SharePoint® databases, Oracle® databases, Sybase™ databases, Postgres, MariaDB®, Couchbase™, Redis™, MongoDB® or other relational or non-relational databases. Systems and methods consistent with disclosed embodiments, however, are not limited to separate databases or even to the use of a database.

In exemplary embodiments of the disclosed technology, the network environment 400 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

In some embodiments, one or more web applications may be utilized by the network environment 400, for example, to interface with the mobile device 440. In certain implementations, the one or more web applications may include one or more web components. A rendered web component, for example, may be at least partially insulated from styles or variables that are defined outside of the web component, it can easily be copied and embedded in a wide variety of different types of code and applications, while preserving its general functionality. Web components may be programmed in a client-side programming language such as Javascript, although this is not a requirement. Any suitable client-side programming language or software language can also be used.

Figure 5:
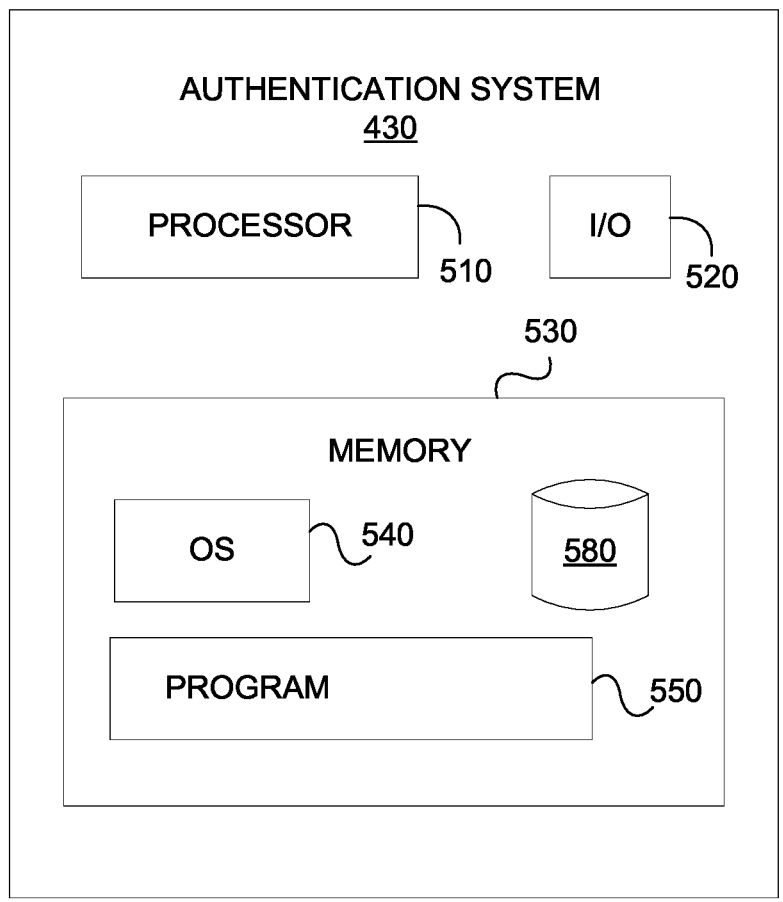
FIG. 5 is a block diagram of an authentication system 430 according to an exemplary implementation of the disclosed technology.

FIG. 5 is a block diagram of the authentication system 430 according to an exemplary implementations of the disclosed technology. The authentication system 430 may have a similar structure and functions as depicted and described above with respect to FIG. 4. The authentication system 430 may include a processor 510, an input/output (I/O) device 520, a memory 530 containing an operating system (OS) 540 and a program 550. For example, the authentication system 430 may be a single server or may be configured as a distributed computer system including multiple servers or computers that interoperate to perform one or more of the processes and functionalities associated with the disclosed embodiments. In some embodiments, the authentication system 430 may further include a peripheral interface, a transceiver, a mobile network interface in communication with the processor 510, a bus configured to facilitate communication between the various components of authentication system 430, and a power source configured to power one or more components of the authentication system 430.

The processor 510 may be one or more known processing devices, such as a microprocessor from the Pentium family manufactured by Intel™ or the Turion™ family manufactured by AMD™. The processor 510 may constitute a single core or multiple core processor that executes parallel processes simultaneously. For example, the processor 510 may be a single core processor that is configured with virtual processing technologies. In certain embodiments, the processor 510 may use logical processors to simultaneously execute and control multiple processes. The processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The authentication system 430 may include or be in communication with one or more peripheral interfaces and may include the hardware, firmware and/or software that enables communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

According to an example implementation of the disclosed technology, the authentication system 430 includes a memory 530 that may store one or more programs 550 to perform one or more functions of the disclosed embodiments. The memory 530 may include one or more memory devices that store data and instructions used to perform one or more features of the disclosed embodiments. The memory 530 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 530 may include software components that, when executed by processor 510, perform one or more processes consistent with the disclosed embodiments. In some embodiments, memory 530 may include a customer information database 580 for storing customer data to facilitate one or more of the processes and functionalities associated with the disclosed embodiments.

The customer information database 580 may include stored data relating to a customer profile and associated customer image, customer accounts, customer mobile devices/applications, customer identification information (e.g., name, age, sex, birthday, address, customer status, preferences, preferred language, greeting name, preferred communication channel, bank accounts, mortgage loan accounts, credit card accounts, car loan accounts, residence, account numbers, authorized users associated with one or more accounts, account balances, account payment history, etc.) and other such account-related information. The customer information database 580 may further include stored data relating to previous interactions between an organization (or its related entity) and a customer. The customer information database 580 may also include information about business transactions between an organization (and/or its related entity) and a customer that may be obtained from, for example, a transaction server. According to some embodiments, the functions provided by the customer information database 580 may also be provided by a database that is external to the authentication system 430.

While the authentication system 430 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the authentication system 430 may include a greater or lesser number of components than those illustrated.

Example Use Case

The following example use case describes an example of a typical user flow pattern. This section is intended solely for explanatory purposes and not in limitation.

In one example, a user traveling on vacation may insert a credit card into the merchant POS terminal 450 to initiate a payment for several nights at a hotel that is in a different state from the user's residence. The service provider system 420 of the authentication system can receive the associated transaction and determine a risk level for the transaction exceeds a threshold risk level because the amount of the transaction is a threshold amount higher than an average purchase for the user and the geolocation is more than a threshold distance from the home address associated with the user in local storage. Since the transaction is determined to be suspicious, the verification system 410 of the authentication system 430 initiates an image-based authentication in this particular example in which the transaction geolocation verification condition is not analyzed when a transaction is determined to be suspicious.

Accordingly, the authentication system 430 retrieves mobile device data for the user and sends a request for a current image via the service provider application 470 of the mobile device 440 associated with the user, which is identified based on the mobile device data. The request may include an indication of a requested thumbs up action and the user may be presented via the service provider application 470 with a request for authorization to access the camera of the mobile device 440. Upon granting access, the service provider application 470 executed the camera application of the mobile device 440 and the user initiates capture while performing the requested thumbs up action. The service provider application 470 receives the captured current image and sends it to the authentication system 430, which analyzes the image to classify the thumbs up action and then sends a selection interface to the mobile device 440 via the service provider application 470.

The selection interface is presented to the user via the display of the mobile device and the user selects the camera roll from the presented options for submission of past images of the user. The service provider application 470 receives the selection, uses an API to access a set of past images in the camera roll, and sends the past images to the authentication system. The verification system 410 of the authentication system 430 executes a face matching algorithm to filter and compare the past images to the current image and determines that a threshold percentage of the past images include the user's face with above a threshold likelihood percentage. The verification system 410 then returns a positive authentication result to the service provider system 420, which allows the purchase transaction to proceed. Thereafter, an approval can be transmitted by the service provider system 420 to the merchant POS terminal 450 and the user can remove the credit card from that device]

In some examples, disclosed systems or methods may involve one or more of the following clauses:

Clause 1: An authentication system, comprising: one or more processors; and memory in communication with the one or more processors and storing instructions that, when executed by the one or more processors, are configured to cause the system to: responsive to receiving transaction data associated with a user and a transaction, determine whether a verification condition is satisfied based on the transaction data; responsive to the transaction data triggering a verification condition, obtain stored mobile data for a user, wherein the transaction data comprises identifying data unique to the user and the mobile data is obtained based on the identifying data; send, via one or more networks and a mobile application executing on a mobile device associated with the user, a request for a current image, wherein the mobile application is identified based on the mobile data and the request comprises an indication of a requested action to be performed by the user; analyze the current image to classify an action depicted in the current image after the current image is obtained from the mobile device in response to the request; and responsive to determining the depicted action corresponds to the requested action: obtain one or more past images associated with the user from one or more of a camera roll of the mobile device, a social media account of the user, or stored account data associated with the user; compare a first set of one or more facial features extracted from the one or more past images to a second set of one or more facial features extracted from the current image to determine when the user is depicted in both one or more of the one or more past images and the current image; and when the user is depicted in both the one or more past images and the current image, allow the transaction to proceed.

Clause 2: The authentication system of clause 1, wherein the instructions, when executed by the one or more processors, are further configured to cause the system to determine that the verification condition is satisfied when a credit card associated with the transaction has been reported as lost or stolen, wherein the credit card is identified based on the identifying data.

Clause 3: The authentication system of clause 1, wherein the transaction is initiated via a merchant point-of-sale (POS) terminal associated with an Internet protocol (IP) address and the instructions, when executed by the one or more processors, are further configured to cause the system to: determine a first geographic location of the merchant POS terminal based on the IP address; ping the mobile device to determine a second geographic location of the mobile device; and determine that the verification condition is satisfied when a proximity of the first geographic location and the second geographic location fails to satisfy a proximity threshold.

Clause 4: The authentication system of clause 1, wherein the instructions, when executed by the one or more processors, are further configured to cause the system to: extract metadata from the one or more past images, wherein the metadata comprises at least a capture date; and deny the transaction when the capture date fails to satisfy a recentness threshold.

Clause 5: An authentication system, comprising: one or more processors; and memory in communication with the one or more processors and storing instructions that, when executed by the one or more processors, are configured to cause the system to: receive transaction data associated with a user and a transaction; determine whether the transaction data satisfies a verification condition based on geographic locations of the mobile device and a merchant point-of-sale terminal from which the transaction was received, whether a credit card associated with the transaction has been reported as lost or stolen, a risk level generated for the transaction, whether the transaction is a step-up transaction, or combinations thereof; obtain stored mobile data for a user, when the received transaction satisfies the verification condition, wherein the transaction data comprises identifying data unique to the user and the mobile data is obtained based on the identifying data; send, via one or more networks and a mobile application executing on a mobile device associated with the user, a request for a current image, wherein the mobile application is identified based on the mobile data and the request comprises an indication of a requested action to be performed by the user; analyze the current image to classify an action depicted in the current image after the current image is obtained from the mobile device in response to the request; and responsive to determining the depicted action corresponds to the requested action: compare a first set of one or more facial features recognized in one or more obtained past images associated with the user to a second set of one or more facial features recognized in the current image to determine when the user is depicted in both the one or more past images and the current image; and when the user is depicted in both the one or more past images and the current image, allow the transaction to proceed.

Clause 6: The authentication system of clause 5, wherein the instructions, wherein the instructions, when executed by the one or more processors, are further configured to cause the system to: send a selection interface via the mobile application, wherein the selection interface is configured to facilitate a selection of one or more sources of the one or more past images and the one or more sources comprise a camera roll of the mobile device, an image album of a social media account of the user, or a profile image in stored account data associated with the user; and obtain the one or more past images based on a received indication of the selection.

Clause 7: The authentication system of clause 5, wherein the instructions, when executed by the one or more processors, are further configured to cause the system to obtain the one or more past images from one or more of: a camera roll of the mobile device after receipt of an acceptance by the user of another request for access to the camera roll; an image album of a social media account of the user after receipt of an acceptance by the user of another request for access to the social media account via a social media service executing on the mobile device; or stored account data associated with the user, wherein the account data comprises a profile image.

Clause 8: The authentication system of clause 5, wherein the instructions, when executed by the one or more processors, are further configured to cause the system to determine a risk level associated with the transaction and determine whether to obtain the one or more past images from one or more of a camera roll of the mobile device, an image album of a social media account of the user, or a profile image in stored account data associated with the user based on the risk level.

Clause 9: The authentication system of clause 5, wherein the instructions, when executed by the one or more processors, are further configured to cause the system to: extract metadata from the one or more past images, wherein the metadata comprises at least a capture date; and deny the transaction when the capture date fails to satisfy a recentness threshold.

Clause 10: The authentication system of clause 5, wherein the indication of the action comprises a textual description of the action or a graphical depiction illustrating the requested action.

Clause 11: An authentication system, comprising: one or more processors; and memory in communication with the one or more processors and storing instructions that, when executed by the one or more processors, are configured to cause the system to: receive transaction data associated with a user and a transaction; responsive to receiving the transaction data, determine whether the transaction data satisfies one or more verification conditions; responsive to determining that the transaction data satisfies the one or more verification conditions, send a request for a current image to a mobile device associated with the user, wherein the request comprises an indication of a requested action to be performed by the user; classify an action depicted in the current image after the current image is obtained from the mobile device in response to the request; determine whether the depicted action corresponds to the requested action based on the classification; and when the depicted action corresponds to the requested action: compare a first set of one or more facial features recognized in one or more obtained past images associated with the user to a second set of one or more facial features recognized in the current image to determine when the user is depicted in both the one or more past images and the current image; and when the user is depicted in both the one or more past images and the current image, allow the transaction to proceed.

Clause 12: The authentication system of clause 11, wherein the instructions, when executed by the one or more processors, are further configured to cause the system to: obtain mobile data for the user after receipt of the transaction; and send the request via a mobile application executing on the mobile device, wherein the mobile application is identified based on the mobile data.

Clause 13: The authentication system of clause 12, wherein the instructions, when executed by the one or more processors, are further configured to cause the system to: send a selection interface via the mobile application, wherein the selection interface is configured to facilitate a selection of one or more sources of the one or more past images and the one or more sources comprise a camera roll of the mobile device, an image album of a social media account of the user, or a profile image in stored account data associated with the user; and obtain the one or more past images based on a received indication of the selection.

Clause 14: The authentication system of clause 11, wherein the instructions, when executed by the one or more processors, are further configured to cause the system to obtain the one or more past images from one or more of: a camera roll of the mobile device after receipt of an acceptance by the user of another request for access to the camera roll; an image album of a social media account of the user after receipt of an acceptance by the user of another request for access to the social media account via a social media service executing on the mobile device; or stored account data associated with the user, wherein the account data comprises a profile image.

Clause 15: The authentication system of clause 11, wherein the instructions, when executed by the one or more processors, are further configured to cause the system to determine a risk level associated with the transaction and determine whether to obtain the one or more past images from one or more of a camera roll of the mobile device, an image album of a social media account of the user, or a profile image in stored account data associated with the user based on the risk level.

Clause 16: The authentication system of clause 11, wherein the transaction comprises an unique identifier and the instructions, when executed by the one or more processors, are further configured to cause the system to determine that the verification condition is satisfied when a credit card associated with the transaction has been reported as lost or stolen, wherein the credit card is identified based on the unique identifier.

Clause 17: The authentication system of clause 11, wherein the transaction is initiated via a merchant point-of-sale (POS) terminal associated with an Internet protocol (IP) address and the instructions, when executed by the one or more processors, are further configured to cause the system to: determine a first geographic location of the merchant POS terminal based on the IP address; ping the mobile device to determine a second geographic location of the mobile device; and determine that the verification condition is satisfied when a proximity of the first geographic location and the second geographic location fails to satisfy a proximity threshold.

Clause 18: The authentication system of clause 11, wherein the instructions, when executed by the one or more processors, are further configured to cause the system to: extract metadata from the one or more past images, wherein the metadata comprises at least a capture date; and deny the transaction when the capture date fails to satisfy a recentness threshold.

Clause 19: The authentication system of clause 11, wherein the indication of the action comprises a textual description of the action or a graphical depiction illustrating the requested action.

Clause 20: The authentication system of clause 11, wherein the transaction comprise an unique identifier and the instructions, when executed by the one or more processors, are further configured to cause the system to determine that the verification condition is satisfied based on one or more of a risk level generated for the transaction, an amount associated with the transaction, a geolocation associated with the transaction, a merchant associated with the transaction, historical transaction data associated with the user, failure of stored mobile device data associated with the user to match current mobile device data obtained with the transaction, or whether a type of the transaction qualifies the transaction as a step-up transaction.

Certain embodiments of the disclosed technology may enable the detection of fraud associated with a transaction that may use a credit card. Embodiments disclosed herein may provide systems and methods for detecting identity misrepresentation, identity creation or identity usurpation related to the transaction. According to an example implementation of the disclosed technology, information supplied by a requester, together with information obtained from other sources, such as public or private databases, may be utilized to determine if the transaction is likely to be fraudulent or legitimate.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An authentication system, comprising:
a mobile device associated with a user;
a merchant point-of-sale (POS) terminal;
one or more processors; and
memory in communication with the one or more processors and storing instructions that, when executed by the one or more processors, are configured to cause the authentication system to:
responsive to receiving transaction data associated with the user and a transaction initiated via the merchant POS terminal:
determine a first geographic location of the merchant POS terminal based on an Internet protocol address associated with the merchant POS terminal;

ping the mobile device to determine a second geographic location of the mobile device; and
determine that a verification condition is satisfied when a proximity of the first and second geographic locations fails to satisfy a proximity threshold;
obtain stored mobile data for the user, wherein the transaction data comprises identifying data unique to the user and the stored mobile data is obtained based on the identifying data;
send, via one or more networks and after initiation of the transaction by the user at a mobile application executing on the mobile device, a request for a current image of the user, wherein the mobile application is identified based on the stored mobile data and the request comprises an indication of a requested action to be performed by the user during capture of the current image;
analyze the current image to classify an action depicted in the current image after the current image is obtained from the mobile device in response to the request; and
responsive to determining the depicted action corresponds to the requested action as a result of the analysis of the current image:
obtain one or more past images identifying the user that initiated the transaction from one or more of a camera roll of the mobile device, a social media account of the user, or stored account data associated with the user;
compare a first set of one or more facial features extracted from the one or more past images to a second set of one or more facial features extracted from the current image to determine whether the user is depicted in both one or more of the one or more past images and the current image, wherein the user performing the requested action is depicted in the current image; and
responsive to determining the user is depicted in both the one or more past images and the current image, allow the transaction to proceed at the mobile application.

2. The authentication system of claim 1, wherein the instructions, when executed by the one or more processors, are further configured to cause the authentication system to determine that the verification condition is satisfied when a credit card associated with the transaction has been reported as lost or stolen, wherein the credit card is identified based on the identifying data.

3. The authentication system of claim 1, wherein the instructions, when executed by the one or more processors, are further configured to cause the authentication system to:
extract metadata from the one or more past images, wherein the metadata comprises at least a capture date; and
deny the transaction when the capture date fails to satisfy a recentness threshold.

4. An authentication system, comprising:
a mobile device associated with a user;
a merchant point-of-sale (POS) terminal having an Internet protocol (IP) address;
one or more processors; and
memory in communication with the one or more processors and storing instructions that, when executed by the one or more processors, are configured to cause the authentication system to:
receive transaction data associated with the user and a transaction received from the merchant POS terminal;
determine whether the transaction data satisfies a verification condition based on a proximity of a first geographic location of the merchant POS terminal, determined based on the IP address, and a second geographic location of the mobile device, determined by pinging the mobile device, whether a credit card associated with the transaction has been reported as lost or stolen, a risk level generated for the transaction, whether the transaction is a step-up transaction, or combinations thereof;
obtain stored mobile data for the user, when the transaction satisfies the verification condition, wherein the transaction data comprises identifying data unique to the user and the stored mobile data is obtained based on the identifying data;
send, via one or more networks and after initiation of the transaction by the user at a mobile application executing on the mobile device, a request for a current image of the user, wherein the mobile application is identified based on the stored mobile data and the request comprises an indication of a requested action to be performed by the user during capture of the current image;
analyze the current image to classify an action depicted in the current image after the current image is obtained from the mobile device in response to the request; and
responsive to determining the depicted action corresponds to the requested action as a result of the analysis of the current image:
obtain one or more past images identifying the user that initiated the transaction from another memory of the mobile device;
compare a first set of one or more facial features recognized in the one or more past images to a second set of one or more facial features recognized in the current image to determine whether the user is depicted in both the one or more past images and the current image, wherein the user performing the requested action is depicted in the current image; and
responsive to determining the user is depicted in both the one or more past images and the current image, allow the transaction to proceed at the mobile application.

5. The authentication system of claim 4, wherein the instructions, when executed by the one or more processors, are further configured to cause the authentication system to:
send a selection interface via the mobile application after initiation of the transaction, wherein the selection interface is configured to facilitate a selection of one or more sources of the one or more past images and the one or more sources comprise a camera roll of the mobile device, an image album of a social media account of the user, or a profile image in stored account data associated with the user; and
obtain the one or more past images based on a received indication of the selection.

6. The authentication system of claim 4, wherein the instructions, when executed by the one or more processors, are further configured to cause the authentication system to obtain the one or more past images from one or more of:

a camera roll of the mobile device after receipt of an acceptance by the user of another request for access to the camera roll;

an image album of a social media account of the user after receipt of an acceptance by the user of another request for access to the social media account via a social media service executing on the mobile device; or stored account data associated with the user, wherein the stored account data comprises a profile image.

7. The authentication system of claim 4, wherein the instructions, when executed by the one or more processors, are further configured to cause the authentication system to determine a risk level associated with the transaction and determine whether to obtain the one or more past images from one or more of a camera roll of the mobile device, an image album of a social media account of the user, or a profile image in stored account data associated with the user based on the risk level.

8. The authentication system of claim 4, wherein the instructions, when executed by the one or more processors, are further configured to cause the authentication system to:
 extract metadata from the one or more past images, wherein the metadata comprises at least a capture date; and
 deny the transaction when the capture date fails to satisfy a recentness threshold.

9. The authentication system of claim 4, wherein the indication of the action comprises a textual description of the action or a graphical depiction illustrating the requested action.

10. An authentication system, comprising:
 a mobile device associated with a user;
 a merchant point-of-sale (POS) terminal;
 one or more processors; and
 memory in communication with the one or more processors and storing instructions that, when executed by the one or more processors, are configured to cause the authentication system to:
  response to receiving transaction data associated with a user and a transaction initiated via the merchant POS terminal:
   determine a first geographic location of the merchant POS terminal based on an Internet protocol address associated with the merchant POS terminal;
   ping the mobile device to determine a second geographic location of the mobile device; and
   determine that a verification condition is satisfied when a proximity of the first and second geographic locations fails to satisfy a proximity threshold;
  after initiation of the transaction by the user, send a request for a current image of the user to the mobile device, wherein the request comprises an indication of a requested action to be performed by the user during capture of the current image;
  classify an action depicted in the current image after the current image is obtained from the mobile device in response to the request;
  determine whether the depicted action corresponds to the requested action based on the classification; and
  after determining the depicted action corresponds to the requested action:
   obtain one or more past images identifying the user that initiated the transaction from another memory of the mobile device;
   compare a first set of one or more facial features recognized in the one or more past images, to a second set of one or more facial features recognized in the current image to determine whether the user is depicted in both the one or more past images and the current image, wherein the user performing the requested action is depicted in the current image; and
   responsive to determining the user is depicted in both the one or more past images and the current image, allow the transaction to proceed at the mobile device.

11. The authentication system of claim 10, wherein the instructions, when executed by the one or more processors, are further configured to cause the authentication system to:
 obtain mobile data for the user after receipt of the transaction; and
 send the request via a mobile application executing on the mobile device, wherein the mobile application is identified based on the mobile data.

12. The authentication system of claim 11, wherein the instructions, when executed by the one or more processors, are further configured to cause the authentication system to:
 send a selection interface via the mobile application after initiation of the transaction, wherein the selection interface is configured to facilitate a selection of one or more sources of the one or more past images and the one or more sources comprise a camera roll of the mobile device, an image album of a social media account of the user, or a profile image in stored account data associated with the user; and
 obtain the one or more past images based on a received indication of the selection.

13. The authentication system of claim 10, wherein the instructions, when executed by the one or more processors, are further configured to cause the authentication system to obtain the one or more past images from one or more of:
 a camera roll of the mobile device after receipt of an acceptance by the user of another request for access to the camera roll;
 an image album of a social media account of the user after receipt of an acceptance by the user of another request for access to the social media account via a social media service executing on the mobile device; or
 stored account data associated with the user, wherein the stored account data comprises a profile image.

14. The authentication system of claim 10, wherein the instructions, when executed by the one or more processors, are further configured to cause the authentication system to determine a risk level associated with the transaction and determine whether to obtain the one or more past images from one or more of a camera roll of the mobile device, an image album of a social media account of the user, or a profile image in stored account data associated with the user based on the risk level.

15. The authentication system of claim 10, wherein the transaction comprises an unique identifier and the instructions, when executed by the one or more processors, are further configured to cause the authentication system to determine that the verification condition is satisfied when a credit card associated with the transaction has been reported as lost or stolen, wherein the credit card is identified based on the unique identifier.

16. The authentication system of claim 10, wherein the instructions, when executed by the one or more processors, are further configured to cause the authentication system to:

extract metadata from the one or more past images, wherein the metadata comprises at least a capture date; and deny the transaction when the capture date fails to satisfy a recentness threshold.

17. The authentication system of claim 10, wherein the indication of the action comprises a textual description of the action or a graphical depiction illustrating the requested action.

18. The authentication system of claim 10, wherein the transaction comprise an unique identifier and the instructions, when executed by the one or more processors, are further configured to cause the authentication system to determine that the verification condition is satisfied based on one or more of a risk level generated for the transaction, an amount associated with the transaction, a geolocation associated with the transaction, a merchant associated with the transaction, historical transaction data associated with the user, failure of stored mobile device data associated with the user to match current mobile device data obtained with the transaction, or whether a type of the transaction qualifies the transaction as a step-up transaction.

* * * * *